Jan. 24, 1961 H. A. LASSEN 2,968,949
INTEGRATING ACCELEROMETER
Filed Nov. 1, 1957 2 Sheets-Sheet 2

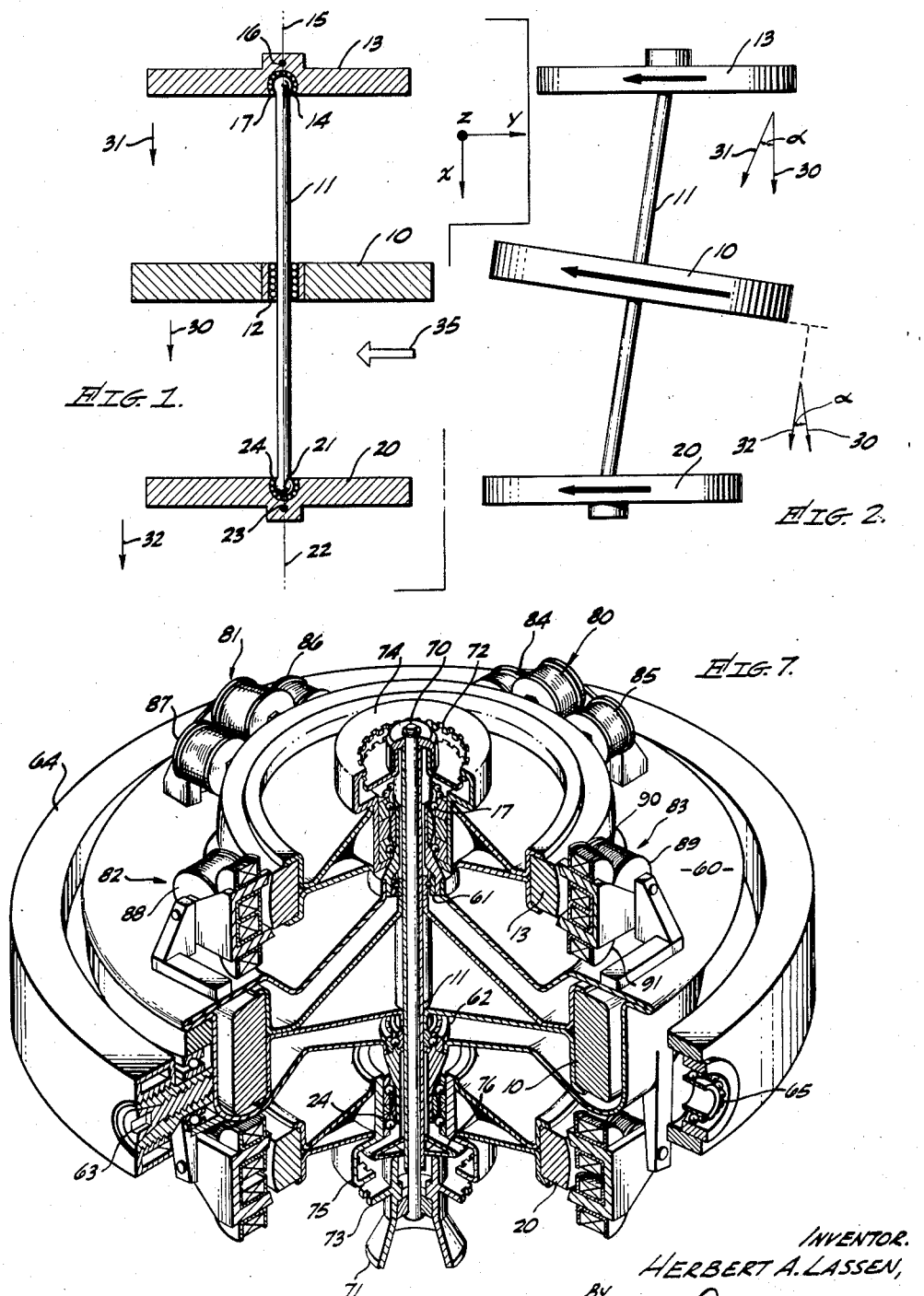

INVENTOR.
HERBERT A. LASSEN,
BY
AGENT.

United States Patent Office 2,968,949
Patented Jan. 24, 1961

2,968,949
INTEGRATING ACCELEROMETER

Herbert A. Lassen, Los Angeles, Calif., assignor to Hughes Aircraft Company, Culver City, Calif., a corporation of Delaware Filed Nov. 1, 1957, Ser. No. 695,475

1 Claim. (Cl. 73—504)

The present invention relates generally to an accelerometer and particularly to a space stabilized integrating accelerometer having two mutually perpendicular sensitive axes.

Heretofore, mechanism used in the sensing of velocity changes along two mutual perpendicular axes has generally included two singly integrating accelerometers. Stable platforms have also generally been required for previous integrating accelerometer systems to provide means for orienting the sensitive axes of the accelerometers in the proper directions thus to sense the desired velocity changes. In addition, if velocity information is obtained by integrating the components of acceleration, many accelerometer systems heretofore used have an inherent disadvantage in that additional circuitry is required to perform the integrating function. Most such integrating accelerometer systems which do not require integrating circuitry do require other additional circuitry such as servo amplifiers.

In a copending application entitled, Integrating Accelerometer, Serial No. 673,714, filed July 23, 1957, by D. D. Williams an integrating accelerometer is provided which has many distinct advantages over prior known integrating accelerometers. In the Williams device an axially unbalanced gyroscopic mass serves as an acceleration sensitive element. The angle through which the unbalanced rotor precesses from its original orientation in space is proportional to the integral of accelerations applied perpendicular to its axis of rotation. A second gyroscopic mass, which is supported in a manner which renders it nonsensitive to applied accelerations, serves to maintain a spatial reference axis and hence a reference frame for measuring the amount of precession of the unbalanced rotor. The Williams device is found to work well and is superior for many applications. In the operation of the Williams device, however, once the axis of rotation of the axially unbalanced rotor is deflected through a substantial angle, accelerations parallel to the reference axis have a component perpendicular to the axis of rotation of the unbalanced rotor and hence introduce error signals. Accelerations parallel to the axis of rotation of the unbalanced rotor, after it has been precessed, have a component perpendicular to the reference axis and therefore a further error may be introduced. In addition, drift of the reference rotor tends to introduce false signals.

It is therefore an object of the present invention to provide an improved integrating accelerometer.

It is a further object of the present invention to provide an improved space stabilized integrating accelerometer.

Another object of the present invention is to provide a space stabilized integrating accelerometer using a plurality of axially unbalanced rotors in a manner such that errors of the type that have been associated with prior known gyroscopic acceleration sensitive systems are reduced.

As set forth in the above referenced copending application of Williams, it has been shown that an axially unbalanced gyroscopic mass or rotor is sensitive to accelerations applied perpendicular to its axis of rotation. Such a rotor will precess at a rate proportional to the component of acceleration applied normal to its axis of rotation. It is further shown that the total angle through which the axis of rotation precesses is proportional to the integral with respect to time of those accelerations normal to the axis of rotation. The direction of precession is at right angles to the applied acceleration and hence an axially unbalanced rotor inherently provides an integration of all accelerations lying in a plane perpendicular to the axis of rotation.

In accordance with the present invention, a pair of gyroscopic masses or rotors, which may be termed first and second sensitive rotors, have their centers of mass disposed upon their respective axes of rotation but noncoincident with their respective centers of rotation. These axially unbalanced rotors are supported in a manner such that they can precess in response to accelerations applied through their centers of suspension and hence serve as acceleration sensitive elements. Two such axially unbalanced rotors are employed, these being either unbalanced in the same direction and rotated in opposite directions, or oppositely unbalanced and rotated in the same direction. Thus, the integrating accelerometer of the present invention corrects for errors normally associated with gyro drift and also for errors normally associated with components of acceleration parallel to the reference axis or to the axis of one of the unbalanced rotors.

The axes of rotation of the two rotors are made initially parallel and coincident with the direction in which it is desired to obtain an integration of perpendicular accelerations. The gyros are then caged in these positions until an integration of all accelerations perpendicular to their axes of rotation is desired. When they are uncaged they will precess in opposite directions in response to a given component of acceleration perpendicular to their axes of rotation, with the angle between their axes of rotation being proportional to the integral of the applied acceleration. A third balanced gyroscopic mass or rotor may be utilized to provide a spatial reference axis and also a spatial reference platform for measuring the displacement between the two unbalanced rotors. Thus, in accordance with one feature of the present invention a plurality of signal coils are maintained in fixed space relationship with respect to a spatial reference axis provided by a reference rotor. These signal coils are so arranged as to measure the angle between the axes of rotation of the two sensitive rotors caused by an acceleration perpendicular to the spatial reference axis. A number of different types of signal systems can be utilized in a manner such that the error signals normally introduced by drift of the reference rotor will be self-cancelling.

Other and further important objects of the invention will become apparent from the disclosures in the following detailed specification, appended claim and accompanying drawings, wherein:

Figure 1 is a schematic representation of the three gyroscopes which may be used in the integrating accelerometer of the present invention;

Fig. 2 is a schematic representation illustrating the positions assumed by portions of the apparatus in the event of drift of the reference gyro, or in the event the reference axis is displaced;

Fig. 7 is a perspective view, partially in section, of an integrating accelerometer in accordance with the present invention.

Figures 3, 4:
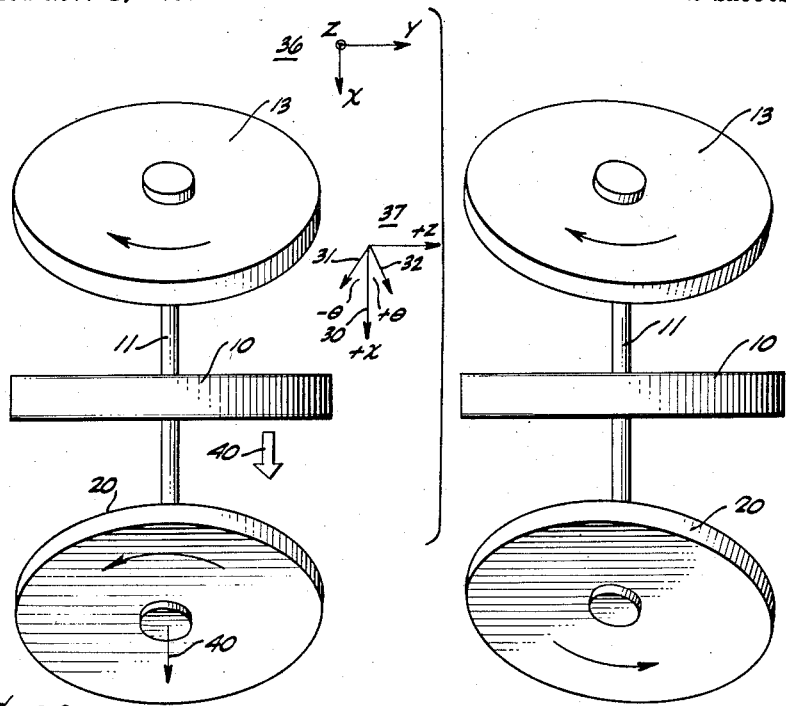
Fig. 3 is a schematic representation illustrating the positions assumed by the gyros in response to an acceleration applied to the gimbal system for the reference rotor and perpendicular to the axis of rotation of the reference rotor.
Fig. 4 is a schematic representation illustrating the positions assumed by portions of the apparatus in response to an acceleration parallel to the reference axis after the unbalanced rotors have been precessed.

Referring now to the drawings, and in particular to Fig. 1, there is shown, for purpose of illustration, in schematic form, a first gyroscopic mass or rotor 10 which is mounted for rotation on a shaft or axle 11 and by means of a bearing system 12. The bearing system 12 so interconnects the shaft 11 and the rotor 10 that the orientation of the shaft 11 is maintained fixed with respect to the plane of rotation of the rotor 10 and hence parallel to the axis of rotation of the rotor. Although a gimbal system is not included in the illustrations or description of the present invention, it is to be understood that such a gimbal system is intended for use herewith and may be any one of a number of well known gimbal structures. Thus, although not shown, the rotor 10 is to be mounted within a gimbal system which will maintain the rotor 10 nonsensitive to applied accelerations. Hence the reference rotor 10 serves to maintain a spatial reference axis which is coincident with the longitudinal axis of the shaft or axle 11. It is, of course, to be further understood that the reference rotor 10 is only one of many methods of providing an axis which corresponds to a direction perpendicular to which an integral of accelerations is desired.

A first acceleration sensitive rotor 13 has a center of rotation 14, that is located on its axis of rotation 15, and a center mass or center of gravity 16, that is also normally located on the axis of rotation 15 but axially displaced from the center of rotation 14. The first rotor 13 is mounted upon the shaft 11 by means of a spherical bearing system 17 or by means of a gimbal structure and rotor bearing or any other mounting which provides at least three degrees of angular freedom between the rotor and the shaft. Because the center of mass of the first acceleration sensitive rotor is non-coincident with the center of rotation, it may be seen that the rotor 13 may be termed an axially unbalanced gyroscopic mass or rotor. It is to be noted that the center of rotation 14 for the first acceleration sensitive rotor 13 lies between the center of mass 16 and the reference rotor 10.

A second acceleration sensitive gyroscopic mass or rotor 20 has a center of rotation 21 lying on its axis of rotation 22 and a center of mass or center of gravity 23 disposed normally on the axis of rotation 22 but displaced from the center of rotation 21. The second rotor 20 is mounted on the opposite end of the shaft 11 by means of a second spherical bearing system 24, or other approximately three degree of angular freedom support. It is to be noted that the center of rotation 21 of the second sensitive rotor 20 is between the center of mass 23 and the reference rotor 10. Thus, the second sensitive rotor 20 is symmetrical with respect to the first sensitive rotor 13, with the center of mass of the rotor 20 being displaced along the axis 22 from the center of rotation 23 in a direction opposite from the displacement of the center of mass 16 along the axis 15 from the center of rotation 14. Hence, the second sensitive rotor 20 is oppositely unbalanced with respect to the unbalance of the first acceleration sensitive rotor 13. It may readily be seen that the present system will operate in an identical manner if the rotors 13 and 20 are unbalanced in the same direction and rotated in opposite directions.

In Fig. 1, each of the rotors 10, 13, and 20 is assumed to be rotating in a clockwise direction as viewed from above. Thus, arrows 30, 31, and 32 represent respectively the angular velocity vectors for the three rotors 10, 13, and 20. It is to be noted that with the sensitive rotors 13 and 20 being oppositely unbalanced, they are rotated in the same direction and hence their angular velocity vectors are initially parallel. If the sensitive rotors are unbalanced in the same direction, that is, if both of the centers of mass are displaced in the same direction along the axle 11, the device of the present invention operates in the same manner providing the sensitive rotors are rotated in opposite directions. This alternative operational characteristic of the present device will be described more in detail hereinafter.

The acceleration sensitive rotors 13 and 20 may advantageously be mounted by means of the spherical bearing systems and therefore the amount of drift associated with these rotors can be made extremely small. In addition, because the sensitive rotors are identical except for opposite unbalance, certain of the drifts associated with one sensitive rotor will be matched by a corresponding drift of the other rotor in a manner such that the resultant output signal generated will be zero as a result of signal cancellation. The integrating accelerometer of the present invention has a further advantage in that if the spatial reference axis, which may advantageously be provided by a gyroscope such as the reference rotor 10, is changed inadvertently through drift of the reference rotor, the output signals generated as a result of displacement of each of the axes of rotation of the sensitive rotors from the spatial reference axis will cancel each other. This is illustrated in Fig. 2, wherein the three rotors are illustrated in the positions they would assume if the reference rotor 10 should drift.

It may thus be seen in Fig. 2 that if the velocity vector 30 for the reference rotor 10 precesses through an angle α from its original position, the angle between the angular velocity vectors 31 and 32 of the sensitive rotors 13 and 20 respectively remains unchanged. If the output signal from the device is proportional to the angle between the vectors 31 and 32, and thus to the angle between the two sensitive rotors, no signal is generated by drift of the reference rotor. This will be more clearly illustrated in Fig. 5.

If an acceleration is applied to a vehicle carrying the integrating accelerometer in a manner such that an acceleration is in effect applied to the centers of suspension for the rotors in the direction indicated by the arrow 35 in Fig. 1, the sensitive rotors 13 and 20 will precess to the positions illustrated in Fig. 3. The reference rotor 10 is of course not affected since it is supported by a gimbal system to render it immune to applied accelerations.

Due to the opposite unbalance of the sensitive rotors it is seen in Fig. 3 that the angular velocity vector for the sensitive rotor 13 precesses in one direction and the angular velocity vector for the second sensitive rotor 20 precesses in the opposite direction.

It is to be noted, however, that the three angular velocity vectors 30, 31, and 32 remain co-planar. This is clearly seen if a righthand system of orthogonal coordinates 36 is utilized and in which the X—Y plane is coincident with the plane of the drawing, the positive X axis points toward the bottom of the drawing, the positive Y axis points toward the righthand edge of the drawing, and the positive Z axis points out from the X—Y plane. Thus it is seen that the tip of the angular velocity vector 31 moves in a direction such that it has a component along a negative Z axis and the tip of the angular velocity vector 32 precesses in a direction such that it has a component along a positive Z axis. This is illustrated in the vector diagram 37 wherein it is seen that the vectors 31 and 32 precess through angles θ which are equal in magnitude. Thus if a signal system is utilized wherein the output signal is proportional to the angle between the vectors 31 and 32, a signal proportional to the integral of the applied acceleration is provided. This is further illustrated in Fig. 5.

Once the acceleration sensitive rotors have precessed to the positions indicated in Fig. 3 it may be seen that an acceleration parallel to the spatial reference axis (or the X axis) will have a component perpendicular to the axis of rotation of each of the sensitive rotors. In prior integrating accelerometers, which utilize gyroscopes as the acceleration sensitive elements, such an acceleration parallel to the X axis or in the direction indicated by the arrow 40 in Fig. 3, would cause an error signal, since it is desired that only accelerations perpendicular to the spatial reference axis generate an output signal. The integrating accelerometer of the present invention accommodates for such an acceleration along the spatial reference axis in a manner which will be explained with reference to Fig. 4.

Figure 5:
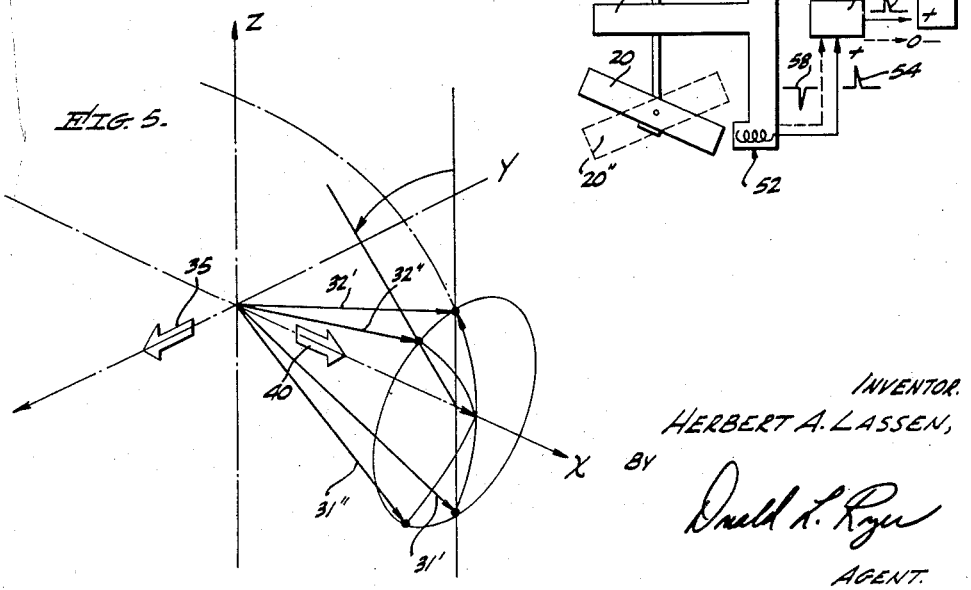
Fig. 5 is a vector diagram illustrating the operation of the integrating accelerometer provided in accordance with the present invention.

In Fig. 4, the sensitive rotors 13 and 20 are illustrated in positions they will assume when an acceleration is applied in the direction indicated by the arrow 40 in Fig. 3, after the sensitive rotors have been precessed to the positions of Fig. 3. It may thus be seen in Fig. 4, that the sensitive rotors precess in the same direction by the same amount, and hence the angle between them is unchanged. Thus, even though the spatial reference line is shifted, the output signal generated is zero. This is illustrated in the vector diagram of Fig. 5 wherein a righthand system of coordinates corresponding to that shown in Fig. 3 is utilized. In Fig. 5 the vector 30 lies along the X axis which thus corresponds to the spatial reference axis provided by the rotor 10. When the rotors are in the positions illustrated in Fig. 1, the vectors 31 and 32 representing respectively the angular velocity vectors of the first and second sensitive rotors are coincident with the vector 30.

When an acceleration is applied to the system in the direction indicated by the arrow 35 of Figs. 1 and 5, the angular velocity vector 31 of the first sensitive rotor 13 precesses to the position indicated by a vector 31′ and the vector 32 precesses to the position indicated by a vector 32′. Thus the angle between the sensitive rotors is changed and an output signal is provided which is proportional to the integral of the acceleration applied perpendicular to the spatial reference axis.

After the sensitive rotors have precessed to the positions represented by the vectors 32′ and 31′, and an acceleration is then applied to the integrating accelerometer parallel to the X axis in the direction indicated by the arrow 40, the angular velocity vectors will be precessed to positions indicated by vectors 31″ and 32″. This is evident from the fact that the components of acceleration perpendicular to the vectors 31′ and 32′ arising from an acceleration along the X axis are in opposite directions, and therefore the oppositely unbalanced rotors precess in the same direction. Thus the angle between the two sensitive rotors, and hence the output signal, remain substantially unchanged by the acceleration parallel to the reference axis. In other words, the error in the direction indicated for the integral of acceleration is second order with respect to error in direction indicated by a single rotor system and a reference axis.

It may further be noted from the vector diagram of Fig. 5, that if an acceleration is applied to the system parallel to the axis of rotation of one of the sensitive rotors after the rotors have been precessed to the positions indicated by the vectors 31′ and 32′, there will be a component of acceleration perpendicular to the axis of rotation of the other sensitive rotor. Thus in Fig. 5, if an acceleration is applied parallel to the axis of rotation of the first sensitive rotor 13 when it has been precessed to the position indicated by the vector 31′, there will be a component of acceleration perpendicular to the stabilized reference axis 30 and an output signal will be generated. In prior devices, an acceleration parallel to the vector 31′ would not change the output signal and hence an undesirable error would be introduced. In the present device, however, it is evident that such an acceleration parallel to the vector 31′ would have a component perpendicular to the vector 32′ causing the second rotor 20 to precess. Hence the angle between the planes of rotation and also between the axes of rotation of the two acceleration sensitive rotors is changed and an output signal is thereby generated.

From the above description, it may be understood that the integrating accelerometer of the present invention inherently accommodates for drift of the spatial reference axis. An additional advantage is that the difference in angular position of the sensitive gyros, and hence the output signal, is unchanged by axial acceleration in the presence of deflection, since under these conditions, both gyros precess identically giving substantially no net error signal. Similarly, the system is unaffected by changes in the center of gravity of the axially unbalanced gyros due to an acceleration, since such shifts or changes in center of gravity are the same for both gyros and hence there is compensation.

Figure 6:
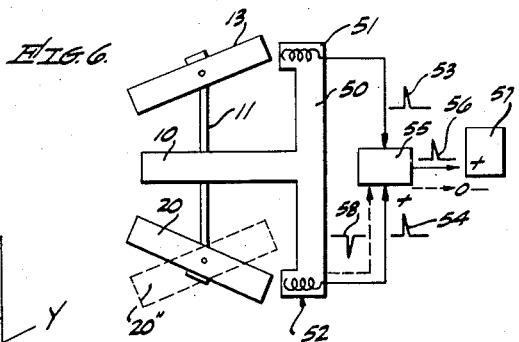
Fig. 6 is a simplified schematic representation of a signal system which may be employed in a device in accordance with the present invention.

The system for providing a signal proportional to the angle between the sensitive rotors 13 and 20 may take any of a number of forms, but for the purpose of illustration, there is shown in Fig. 6 a schematic representation of a simplified signal system which may be utilized to provide electrical signals proportional to the angle between the sensitive rotors. Thus, in Fig. 6, a reference frame 50 is illustrated schematically as being attached to the reference rotor 10 and therefore in fixed spaced relationship with the longitudinal axis of the axle 11 which, in turn, coincides with the spatial reference axis provided by the rotor 10. A first signal coil 51 is shown in schematic form in one end of the frame 50 and is adapted to detect the displacement of the first sensitive rotor 13 from a position parallel to the reference rotor 10. A second signal pick up winding 52 is positioned in the opposite end of the frame 50 and is adapted to provide an electrical signal proportional to the displacement of the second sensitive rotor 20 from a position parallel to the reference rotor 10. The signal windings 51 and 52 are shown in schematic form and represent various types of well known signal devices.

A signal system such as that illustrated schematically in Fig. 6 has many advantages in that the signals generated inherently accommodate for spurious error signals. For example, when an acceleration is applied to the system causing the sensitive rotors to precess to the positions indicated by the rotors 13 and 20 in Fig. 6, a signal 53, which may be of a positive polarity, is generated in the first signal winding 51 and a corresponding signal 54 of the same polarity generated in the second signal winding 52. These two signals which are equal in magnitude and in the same sense may then be compared or added by a signal comparator 55 and a resultant signal provided to a utilization device 57. If an acceleration is applied to the system parallel to the spatial reference axis in the manner described in conjunction with the Figs. 3 and 4, above and causing the sensitive rotors to precess in the same direction and thus to positions illustrated in Fig. 6 by the rotors 13 and 20″, the signal winding 51 will generate signal 53 and the second signal winding 52 will generate a corresponding signal 58 which is equal in magnitude but opposite in polarity. When the two signals 53 and 58 are compared or added in the signal comparator 55, they will cancel each other and hence there will be no signal applied to the utilization device 57. In this manner it is evident that a number of signal systems, corresponding to that illustrated schematically in Fig. 6, may be utilized to provide electrical signals proportional to the integral of all accelerations applied perpendicular to a given direction.

To illustrate with more particularity one particular physical embodiment of an integrating accelerometer constructed in accordance with the present invention, reference is made to Fig. 7, wherein the reference rotor 10 is shown as being connected to the shaft 11 and, hence, as the rotor 10 rotates, it serves to maintain a spatial reference axis which is coincident with the longitudinal axis of the axle or shaft 11. An inner gimbal frame 60 is coupled with the shaft 11 by means of bearing systems 61 and 62, thus to permit rotation of the axle 11 and rotor 10 independent of this inner gimbal frame.

To maintain the spatial reference axis nonsensitive to applied accelerations, two sets of mutually perpendicular trunnion systems are utilized to support the inner gimbal frame 60, and hence the rotors of the integrating accelerometer. Thus, the inner gimbal frame 60 is supported by a set of inner trunnions, only one of which, 63, is shown in the drawing, and which is seen to interconnect the inner gimbal frame 60 and an outer gimbal frame 64. The outer gimbal frame 64 is, in turn, supported by a set of outer trunnions (not shown), a bearing system 65 for one of said outer trunnions being shown.

A drive shaft 70, having a drive cone 71 connected to one end thereof, is free to move in a longitudinal direction within the shaft 11, but is so interconnected with the shaft 11 that there can be no relative rotation between the axle 11 and the drive shaft 70. First and second drive toothed clutch members 72 and 73 are connected respectively to opposite ends of the drive shaft 70 and are adapted respectively to engage additional toothed clutch members 74 and 75, the clutch member 74 being connected to the first sensitive rotor 13, and the clutch member 75 being connected to the second sensitive rotor 20.

A Belleville type compression spring member 76 serves to maintain the drive shaft 70 and clutch members in a normally disengaged position. Thus, the drive shaft 70, spring member 76, and the four clutch members form a caging mechanism which is illustrated in Fig. 7 in the uncaged position.

When torque is applied to the drive cone 71 by means of any suitable power source, such as for example an electric motor or an air turbine, and in a manner such that the drive shaft 70 is moved in an upward direction within the axle 11 to cause the clutch members 72 and 74, and 73 and 75, to inter-mesh, it is seen that all three rotors will be rotated. It is also to be noted that during the time that torque is being supplied to all three rotors, the planes of rotation for the rotors will be maintained parallel.

When an integration of accelerations applied perpendicular to the spatial reference axis is desired, the sensitive rotors are uncaged from the drive shaft 70, and are thereby free to precess about the spherical bearing systems 17 and 24. After the sensitive rotors have been uncaged, the reference rotor 10 may still be supplied with torque, if such a system is desired, since the drive shaft 70 is so interconnected with the axle 11 that the two elements 70 and 11 are in torque exchange relationship.

To provide electrical signals proportional to the angular displacement between the sensitive rotors 13 and 20, and hence signals proportional to the integral of accelerations perpendicular to the spatial reference axis, a plurality of flux driving coils and signal pick up coils are mounted upon the inner gimbal frame 60 about the periphery of the sensitive rotors 13 and 20. Since the signal system associated with the second sensitive rotor 20 is identical to that associated with the first sensitive rotor 13 only, the signal system for the first sensitive rotor will be described.

Thus, four sets of flux driving coils 80, 81, 82, and 83, are positioned about the periphery of the rotor 13, with each set of flux driving coils including two coils. Thus coils 84 and 85, and 86 and 87 form the sets 80 and 81. Only one coil 88 of a pair for the set 82 is shown, and likewise only one coil 89 of a pair for the set 83 is shown. Each of the flux driving coils has a longitudinal axis which is co-planar with the plane of the rotor 13 when it is parallel to the reference rotor 10. When an alternating electrical signal is applied to each set of flux driving coils four magnetic circuits, each including the sensitive rotor 13, will be established. Positioned in a plane perpendicular to the plane of rotation of the reference rotor 10, and between the two flux driving coils of each set of flux driving coils 80, 81, 82, and 83, is a pair of signal pick up windings adapted to detect any unbalance in the magnetic circuit provided by the flux driving coils.

Since each set of signal pick up windings is identical, only one set will be described. Thus, the signal pick up windings 90 and 91, shown in cross-section, are positioned between the flux driving coils of the fourth set of coils 83 and spaced equidistant from the plane of the rotor 13 when it is parallel to the rotor 10. The signal generated in the first pick up winding 90 by the changing magnetic field of the flux driving coils will be equal in magnitude to the signal generated in the second signal winding 91 only when the magnetic path of the rotor 13 is equal for the two windings. This situation, of course, exists only at a time when the acceleration sensitive rotor 13 is parallel to the plane of rotation of reference rotor 10. Utilizing a signal system corresponding to that illustrated schematically in Fig. 6, it is evident that signals can be obtained which are proportional to the displacement between the rotors 13 and 20 and hence proportional to the integral with respect to time of all accelerations applied perpendicular to the shaft 11. Phase information concerning the direction of such displacement and hence information relating to the direction of velocity change is provided.

Although the integrating accelerometer of the present invention can take a wide variety of physical forms, that illustrated in Fig. 7 has a particular advantage in that if the electrical signals provided by the signal pick up windings are used to control the motion of a moving body, a minimum amount of additional circuitry is required to process the signals. That is, the signals generated in the signal pick up windings can be applied directly to the control members of the carrying vehicle such as, for example, the pitch and yaw controls of an aircraft.

There has thus been disclosed an integrating accelerometer which inherently accommodates and corrects for many of the errors associated with prior art integrating accelerometers which utilize gyroscope masses as the acceleration sensitive elements. In addition, the integrating accelerometer of the present invention lends itself well to a signal system which is extremely simple and which can be used to provide electrical signals for controlling the direction of movement of the carrying vehicle.

Having thus described the invention and the present embodiment thereof, it is desired further to emphasize the fact that many modifications may be resorted to in a manner limited only by a just interpretation of the following claim.

I claim:

An integrating accelerometer comprising, in combination: means for providing a reference axis nonsensitive to accelerations; a shaft having a longitudinal axis; first and second rotors, each rotor having a center of rotation, an axis of rotation and a center of mass lying upon their respective axes of rotation and displaced axially in opposite directions from each respective center of rotation, first and second spherical bearing systems respectively interconnecting opposite ends of said shaft with and supporting said first and second rotors to permit precession of said rotors about each respective center of rotation; caging means for selectively aligning said axes of rotation coincident with said reference axis; and means including a plurality of magnetic circuits including a plurality of coils positioned adjacent peripheries of said rotors and responsive to the angular displacement between said rotors, whereby to provide a signal proportional to an integral of accelerations perpendicular to said reference axis.

References Cited in the file of this patent

UNITED STATES PATENTS

| | | |
|---|---|---|
| 1,372,184 | Minorsky | Mar. 22, 1921 |
| 1,446,348 | | |
| 1,692,412 | | |
| 1,954,998 | | |
| 2,539,772 | | |
| 2,566,305 | | |
| 2,752,792 | | |
| | Hort | Feb. 20, 1923 |
| | Koenig | Nov. 20, 1928 |
| | Hoffmann | Apr. 17, 1934 |
| | Dawson | Jan. 30, 1951 |
| | Beacom | Sept. 4, 1951 |
| | Draper | July 3, 1956 |